US009652174B2

(12) United States Patent
Chao et al.

(10) Patent No.: US 9,652,174 B2
(45) Date of Patent: May 16, 2017

(54) MANAGING AN ANALYTIC FUNCTION TO BE PERFORMED ON DATA STORED IN AN INPUT BLOCK

(75) Inventors: Neil Earnest Chao, Cambridge, MA (US); Hongmin Fan, Arlington, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 185 days.

(21) Appl. No.: 14/398,269

(22) PCT Filed: Jun. 4, 2012

(86) PCT No.: PCT/US2012/040767
§ 371 (c)(1),
(2), (4) Date: Oct. 31, 2014

(87) PCT Pub. No.: WO2014/070129
PCT Pub. Date: May 8, 2014

(65) Prior Publication Data
US 2015/0089177 A1 Mar. 26, 2015

(51) Int. Cl.
*G06F 12/00* (2006.01)
*G06F 3/06* (2006.01)
(Continued)

(52) U.S. Cl.
CPC ............ *G06F 3/0647* (2013.01); *G06F 3/067* (2013.01); *G06F 5/00* (2013.01); *G06F 3/0623* (2013.01);
(Continued)

(58) Field of Classification Search
CPC .......... G06F 3/0647; G06F 3/067; G06F 5/00; G06F 12/0215; G06F 12/0253; G06F 12/0623; G06F 12/0676
(Continued)

(56) References Cited

U.S. PATENT DOCUMENTS 5,890,212 A    3/1999  Sokolov
6,430,653 B1   8/2002  Fujikawa
(Continued)

FOREIGN PATENT DOCUMENTS

TW           200424948        10/2004

OTHER PUBLICATIONS

Sakr et al., "Run-Time Reconfigurable Hardware Blocks for Multimedia Application", University of Ottawa, IEEE, pp. 1996-1999, May 2005.*
(Continued)

*Primary Examiner* — Reba I Elmore
(74) *Attorney, Agent, or Firm* — Mannava & Kang, P.C.

(57) ABSTRACT

In an example, an analytic function to be performed on data stored in an input block is managed through an interface to a framework through which a user is to define the analytic function. The framework is to buffer batches of the data into a memory through implementation of a Reader, a Writer, a PreReader, and a PreWriter on the data stored in the input block when the user-defined analytic function is performed, and wherein the Reader, the Writer, the PreReader, and the PreWriter are individually movable with respect to each other in the input block. In addition, the user-defined analytic function is received through the interface.

20 Claims, 6 Drawing Sheets

(51) Int. Cl.
  *G06F 5/00* (2006.01)
  *G06F 12/06* (2006.01)
  *G06F 12/02* (2006.01)
(52) U.S. Cl.
  CPC ........ *G06F 3/0676* (2013.01); *G06F 12/0215* (2013.01); *G06F 12/0253* (2013.01); *G06F 12/0623* (2013.01); *G06F 12/0676* (2013.01)
(58) Field of Classification Search
  USPC ........ 711/152, 156, 165; 707/792, 802, 813; 712/17, 225; 715/708, 739, 853; 717/119, 120, 149, 170, 175
  See application file for complete search history.

(56) References Cited

U.S. PATENT DOCUMENTS

| | | |
|---|---|---|
| 6,636,908 B1 | 10/2003 | Winokur et al. |
| 6,799,246 B1 | 9/2004 | Wise et al. |
| 7,644,087 B2 | 1/2010 | Barkai et al. |
| 7,953,891 B2 | 5/2011 | Blaszczak et al. |
| 2004/0042477 A1 | 3/2004 | Bitar et al. |
| 2004/0202073 A1 | 10/2004 | Lai |
| 2005/0240745 A1 | 10/2005 | Iyer et al. |
| 2006/0155516 A1 | 7/2006 | Johnson et al. |
| 2008/0021502 A1 | 1/2008 | Imielinska et al. |
| 2010/0071055 A1* | 3/2010 | Kaniz .................. H04L 63/164 726/14 |
| 2011/0099349 A1* | 4/2011 | Yano .................. G06F 12/0246 711/170 |
| 2011/0270896 A1 | 11/2011 | Stegelmann |

OTHER PUBLICATIONS

Li et al., "Design of Memory Sub-System with Constant-Rate Bumping Process for H.264/AVC Decoder", pp. 209-217, IEEE, Jan. 15, 2007.*

Gruenwald et al., "Managing real-time database transactions in mobile ad-hos networks", Springer Science + Business Media, pp. 27-53, Jan. 20, 2007.*

International Searching Authority, Appl. No. PCT/US2012/040767, filed Jun. 4, 2012, Search Report and Written Opinion, 13pp, dated May 12, 2014.

Nicolae, B. et al., Distributed Management of Massive Data: an Efficient Fine-grain Data Access Scheme, http://webcache.googleusercontent.com/search?q+cache:AvhNybjDye8J:hal.inria.fr/docs/00/32/32/48/PS/paper.ps +&cd=7&hl=en&ct=clnk > (Research Paper), Retrived May 16, 2012.

White, P., Understanding and Using Parallelism in SQL Server,<http://www.simple-talk.com/sql/learn-sql-server/understanding-and-using-parallelism-in-sql-server/>, Mar. 3, 2011.

European Patent Office, Supplemental European Search Report, Dec. 18, 2015, European Patent Application No. 12887850.1, 7 pages.

* cited by examiner

MANAGING AN ANALYTIC FUNCTION TO BE PERFORMED ON DATA STORED IN AN INPUT BLOCK

BACKGROUND

Analytic functions are often performed to analyze data stored in relatively large input blocks. Programmers program various aspects of the analytic functions, such as when a Reader and a Writer are to advance as well as rules associated with buffering the data to be analyzed. One of the various rules includes programming when the data is to be stored on a disk (e.g., a hard-drive disk) instead of a memory (e.g., a random access memory (RAM)), such as when the distance between the Reader and the Writer exceeds a buffer size. Another of the various rules includes programming when the memory is to be released for the current batch of data. When the amount of data that is to be buffered is relatively large, as may occur under implementation of various analytic functions, the programming of the analytic functions is often relatively difficult and time consuming.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1A:
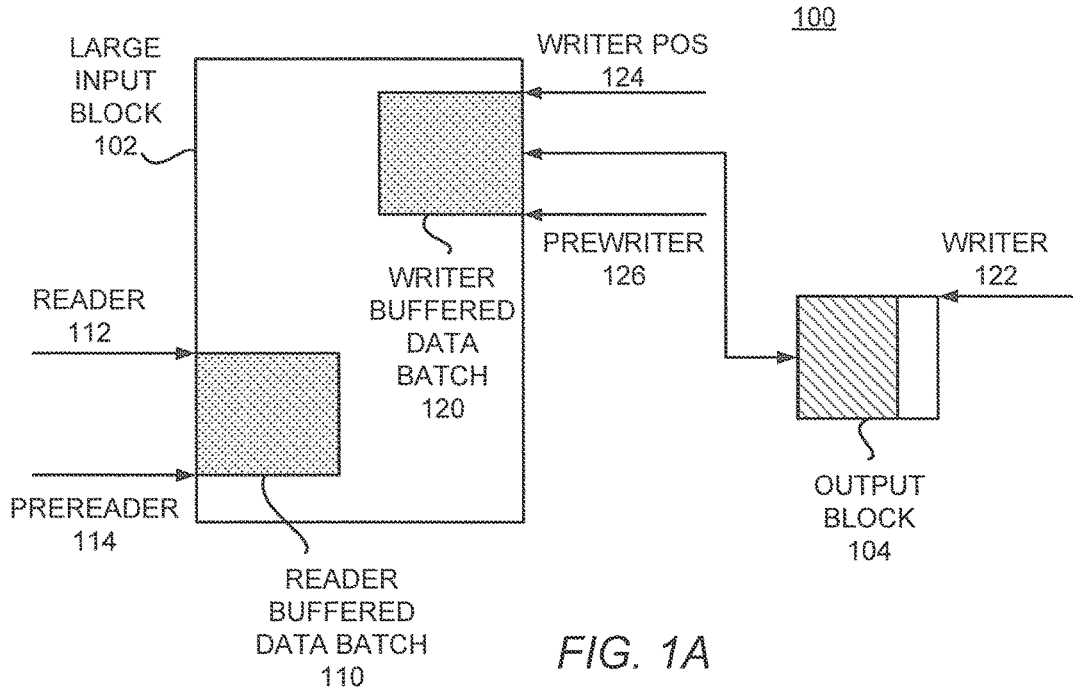
FIGS. 1A-1C, respectively, show diagrams for states of the framework disclosed herein, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

Existing frameworks for user-defined analytic functions typically make it very difficult to produce output rows in an output block that require a full pass over the data while copying over carry-over information in the output block. An example of a user-defined analytic function is the "NthValue" function, which outputs every full row in a block, followed by the nth row. When the N grows too large to fit into memory, existing frameworks operate under reduced performance or require relatively cumbersome programming by a user to continue operating. Another example of user-defined analytic function is the "Lag" function, which outputs, for every row in a block, that current row followed by the row N before the current row. When the lag offset grows too large, the N rows of data before the current row can no longer be stored in memory. Existing frameworks often attempt to solve this issue by writing the data temporarily to a hard-drive disk. However, accessing data that is written onto a hard-disk drive is often inefficient.

Disclosed herein is a method for managing an analytic function to be performed on data stored in an input block that allows for independent and/or individual Reader and Writer movement through the input block. Also disclosed herein are an apparatus for implementing the method and a non-transitory computer readable medium on which is stored machine readable instructions that implement the method.

In the method and apparatus disclosed herein, the Reader and the Writer point to different locations in the input block, while materializing the necessary data only when requested. This enables the buffering of the data to be hidden from the user, such as a programmer, while also substantially optimizing the efficiency of the buffering. Particularly, the interface disclosed herein implements two un-exposed accessors, a PreReader and a PreWriter, as well as context switching, that enables the Reader and the Writer to be independently and/or individually advanced in the input block. This also provides the illusion to the user that the entire input block fits in memory.

In addition, the interface disclosed herein implements an automatic buffering mechanism, in which the buffering is performed without requiring that a user input instructions regarding how the buffering is to be performed. Particularly, the PreWriter and the PreReader are programmed to perform various functions in the implementation of analytic functions on data stored in a large input block, in which the implementation of the analytic functions includes the automatic buffering. Generally speaking, the PreWriter is an accessor that controls a boundary of a batch of data from the Writer, which is also an accessor, that is copied into a memory and automatically (e.g., without user intervention) moves to a position that defines the boundary of a next batch of data to be stored in the memory when the Writer reaches the PreWriter. In addition, the PreWriter moves the next batch of data from the input block into the memory, copies over carry-over information to an output block, and releases the part of the memory that buffered the batch of data back, for instance, to an operating system.

Likewise, the PreReader is an accessor that controls a boundary of a batch of data from the Reader, which is also an accessor, that is copied into a memory and automatically moves to a position that defines the boundary of a next batch of data to be stored in the memory when the Reader reaches the PreReader. In addition, the PreReader moves the next batch of data from the input block into the memory, copies over carry-over information to an output block, and releases the part of the memory that buffered the batch of data back, for instance, to an operating system. Particularly, for instance, the batch of data that is bounded by either the PreReader or the PreWriter is put into memory so that the batch of data may be accessed quickly. When the Reader (or Writer) advances beyond the boundary defined by the PreReader (or PreWriter), the user no longer needs quick access into the batch of data. As such, the part of the memory that had buffered this batch of data is released so that that part of the memory may be used to store other data for which quick access is desired and/or required.

Through implementation of the method and apparatus disclosed herein, an interface to a framework is provided through which a user, such as a programmer or other type of user, may define analytic functions without having to also define when and which blocks of data are to be buffered in memory and, in various instances, written to and read from a disk, during implementation or invocation of the analytic functions. This may generally simplify programming of the analytic functions.

With reference first to FIG. 1A, there is shown a diagram 100 of a state of the framework disclosed herein, according to an example. As shown therein, data contained in a large input block 102 is written to an output block 104. Generally speaking, the large input block 102 comprises a portion of a stable storage apparatus, such as, a hard disk, a solid state drive, a tape based storage, etc. In addition, the output block 104 comprises an area in a memory (not shown) into which blocks of data are to be stored for access by a user, for instance, a user who performs an analytic function on the data stored in the large data block 102. The memory comprises any of RAM, dynamic random access memory (DRAM), magnetoresistive random access memory (MRAM), Memristor, flash memory, etc. According to an example, the large input block 102 is relatively larger than the memory, such that the memory is unable to store all of the data contained in the large input block 102 at one time.

The output block 104 represents the carry-over data that has already been copied over from the large input block 102. The data is carried over to the output block 104, for instance, to preserve the state of the data in the large input block 102. In any regard, as an analytic function is operated on the data contained in the large input block 102, batches of data 110 and 120 are buffered to the memory and then written to the output block 104. Particularly, when the Reader leads the Writer by a distance corresponding to an amount of data greater than may be stored in the memory, a batch of data 110 corresponding to a particular batch of data between a current position of a Reader 112 and a PreReader 114 may be stored in one area of the memory and a batch of data 120 corresponding to a particular batch of data between the current position of a Writer 124 and a PreWriter 126 may be stored in another area of the memory. However, when and if the Writer 122 catches up to the Reader 112, the Reader buffered data batch 110 and the Writer buffered data batch 120 may be stored in the same area of the memory. According to an example, therefore, the framework disclosed herein is to employ intelligent buffering that substantially minimizes the amount of space in the memory that is required to be reserved for the Reader buffered data batch 110 and the Writer buffered data batch 120.

In addition, because the Reader buffered data batch 110 and the Writer buffered data batch 120 are able to be stored in separate areas of the memory and the Reader 112 is able to be independently moved with respect to the Writer 122, data need not be written to a disk as readily as is typically required in conventional frameworks. In one regard, therefore, the framework of the present disclosure generally enables greater efficiency with respect to the writing of data to the output block 104 since writing from the memory is typically significantly faster than writing from the disk.

By way of example, an analytic function comprises a query pertaining to how particular data (target) stored in the large input block 102 compares with other data stored in the large input block 102. In this example, the Reader 112 is advanced row by row until the Reader 112 reaches the target. The Writer 122 is then advanced to compare the remaining data in the large input block 102 with the target. A particular example of such a function comprises determining a top producer's sales versus all of the other salespeople in an organization. In this example, the Reader 112 will go through the data to identify the top producer and the sales amount for that person will be stored. The Writer 122 may then take the sales amount and go through the large input block 102 to compare the sales amount for the top producer with the sales amounts of the other salespeople.

Figure 1B:
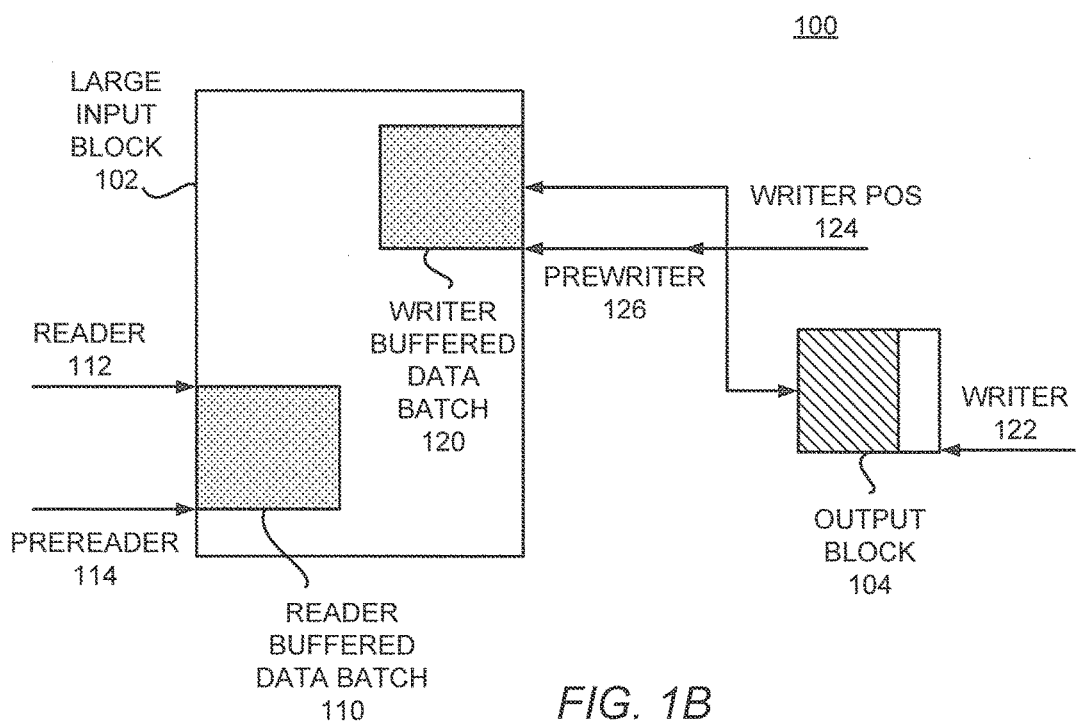
Figure 1C:
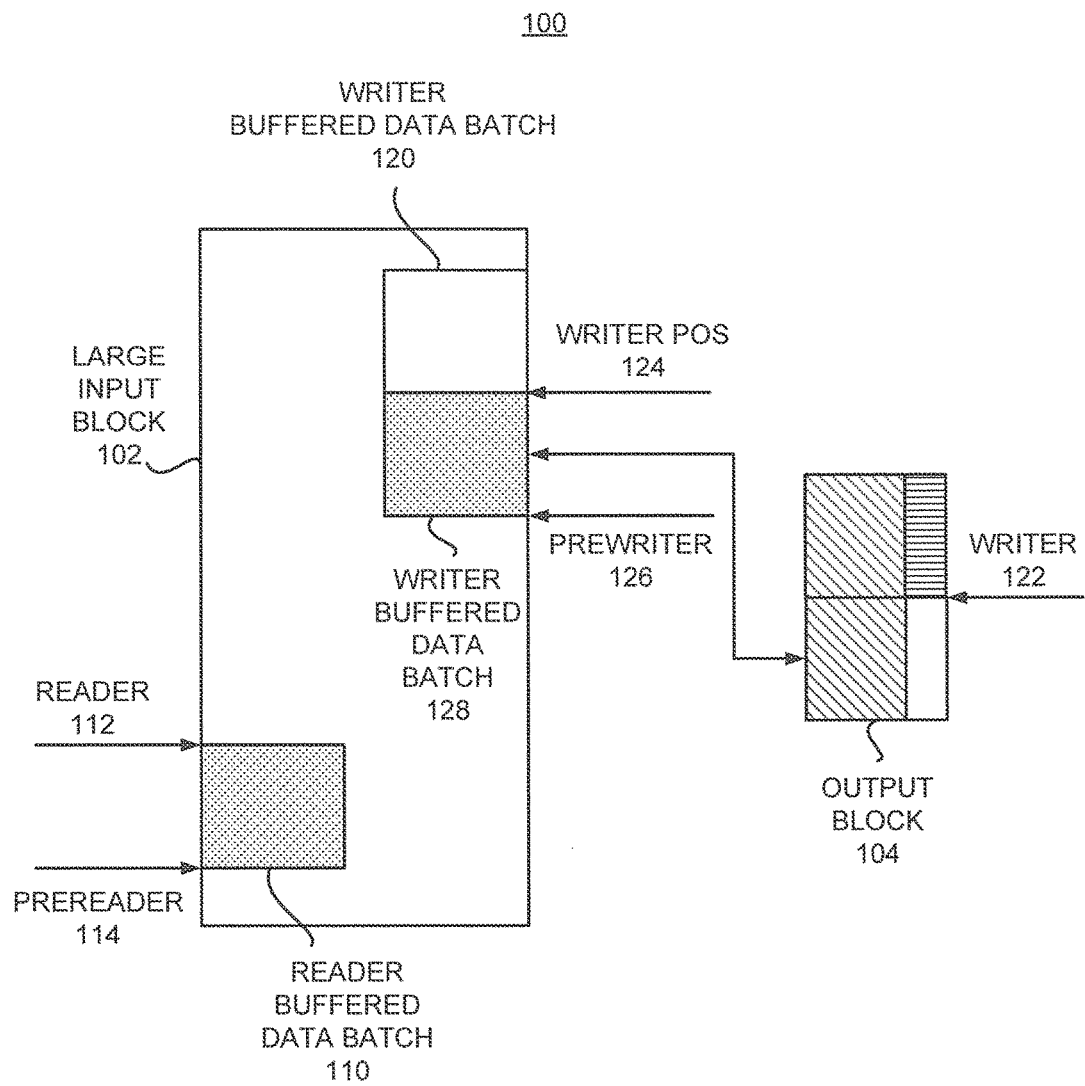

Turning now to FIG. 1B, there is shown a diagram 100 of another state of the framework disclosed herein, according to an example. As shown in FIG. 1B, the Writer 122 has advanced to the position of the PreWriter 126 and has thus read all of the rows that the PreWriter 126 has previously buffered. At this point, the next call to advance the Writer 122 invokes a context switch to the PreWriter's 126 advancing code. The PreWriter's 126 advancing code is to prepare the next writable block for the user. Particularly, and as shown in FIG. 1C, the PreWriter 126 moves the next batch of data 128 from the large input block 102 into memory and copies over the carry-over information to the output block 104, which is now relatively larger. In addition, the previous batch of data 120 that was in memory is released back to the operating system. However, because the PreWriter 126 is unexposed to the user, from the user's perspective, the last call to advance the Writer 122 is the same as any of the previous calls to advance the Writer 122.

Although not shown in FIGS. 1A-1C, the same process discussed above is implemented by the PreReader 114 when the user advances the Reader 112.

When the distance between the PreReader 114 and PreWriter 126 is sufficiently small, the framework disclosed herein is programmed to have both of the PreReader 114 and the PreWriter 126 read from the same buffer. When the distance between the PreReader 114 and PreWriter 126 is relatively large, the framework disclosed herein is programmed to allocate separate buffers for the Reader buffered data batch 110 and the Writer buffered data batch 120, releasing each one as soon as they finish consuming their data. If, in the above-example, the PreWriter 126 eventually catches up with the PreReader 114, the interface is programmed to release one of the memory buffers as it has become a duplicate of the other.

Figure 2:
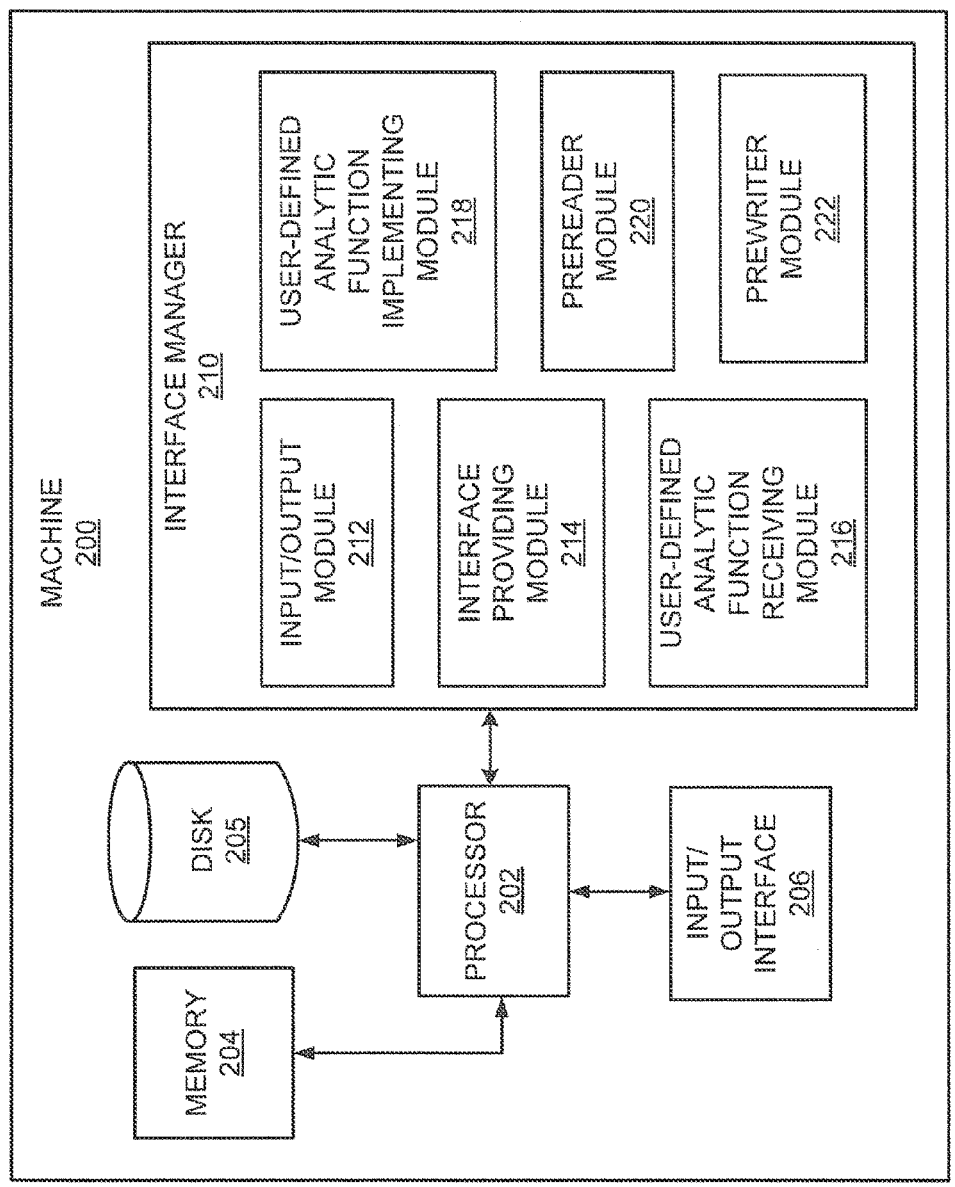
FIG. 2 illustrates a block diagram of a machine, according to an example of the present disclosure.

Turning now to FIG. 2, there is shown a block diagram of a machine 200, according to an example of the present disclosure. It should be understood that the machine 200 may include additional components and that one or more of the components described herein may be removed and/or modified without departing from a scope of the machine 200.

The machine 200 is depicted as including a processor 202, a memory 204, a disk 205, an input/output interface 206, and an interface manager 210. The machine 200 comprises any of, for instance, a server, a computer, a laptop computer, a tablet computer, a personal digital assistant, a cellular telephone, or other electronic apparatus that is to perform a method for managing an analytic function on data stored in an input block. The machine 200 may therefore include the input block and may store the data and/or may manage the performance of the analytic function on data stored in other machines, such as servers, disk arrays, etc.

The interface manager 210 is depicted as including an input/output module 212, an interface providing module 214, a user-defined analytic function receiving module 216, a user-defined analytic function implementing module 218, a PreReader module 220, and a PreWriter module 222. The processor 202, which may comprise a microprocessor, a micro-controller, an application specific integrated circuit (ASIC), or the like, is to perform various processing functions in the machine 200. One of the processing functions includes invoking or implementing the modules 212-222 contained in the interface manager 210 as discussed in greater detail herein below.

According to an example, the interface manager 210 comprises a hardware device, such as a circuit or multiple circuits arranged on a board. In this example, the modules 212-222 comprise circuit components or individual circuits. According to another example, the interface manager 210 comprises a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like. In this example, the modules 212-222 comprise software modules stored in the interface manager 210. According to a further example, the modules 212-222 comprise a combination of hardware and software modules. According to a particular example, the modules 212-222 comprise software modules provided to a user as part of a software development kit (SDK).

The input/output interface 206 comprises a hardware and/or a software interface. In any regard, the input/output interface 206 may be connected to an internal bus and/or to a network, such as the Internet, an intranet, etc., over which the interface manager 210 may receive and communicate information. The processor 202 may store information received through the input/output interface 206 in the disk 205 and may use the information in implementing the modules 212-222. The memory 204 comprises volatile and/or non-volatile memory, such as DRAM, EEPROM, MRAM, phase change RAM (PCRAM), Memristor, flash memory, and the like. The disk 205 comprises a stable storage apparatus, such as, a hard disk, a solid state drive, a tape based storage, etc.

Although the memory 204 and the disk 205 have been depicted as comprising part of the machine 200, it should be clearly understood that either or both of the memory 204 and the disk 205 may be separately located from the machine 200. In these examples, the processor 202 may communicate with either or both of the memory 204 and the disk 205 through the input/output interface 206.

Figure 3:
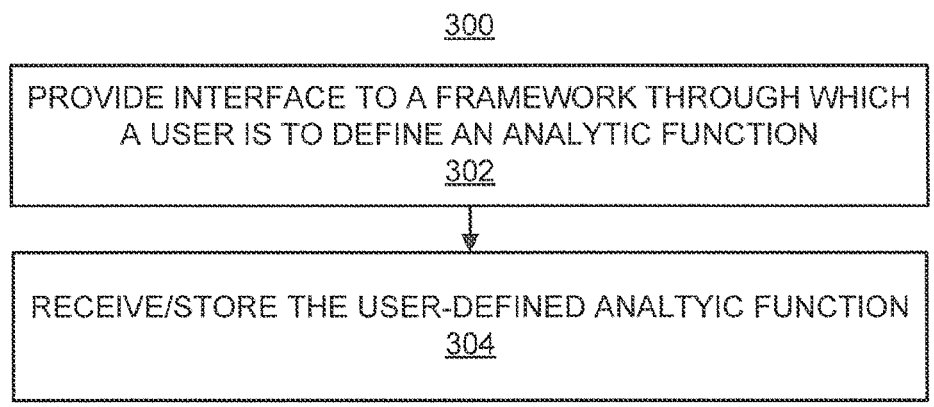
FIG. 3 depicts a flow diagram of a method for managing an analytic function to be performed on data stored in an input block, according to an example of the present disclosure.
Figure 4A:
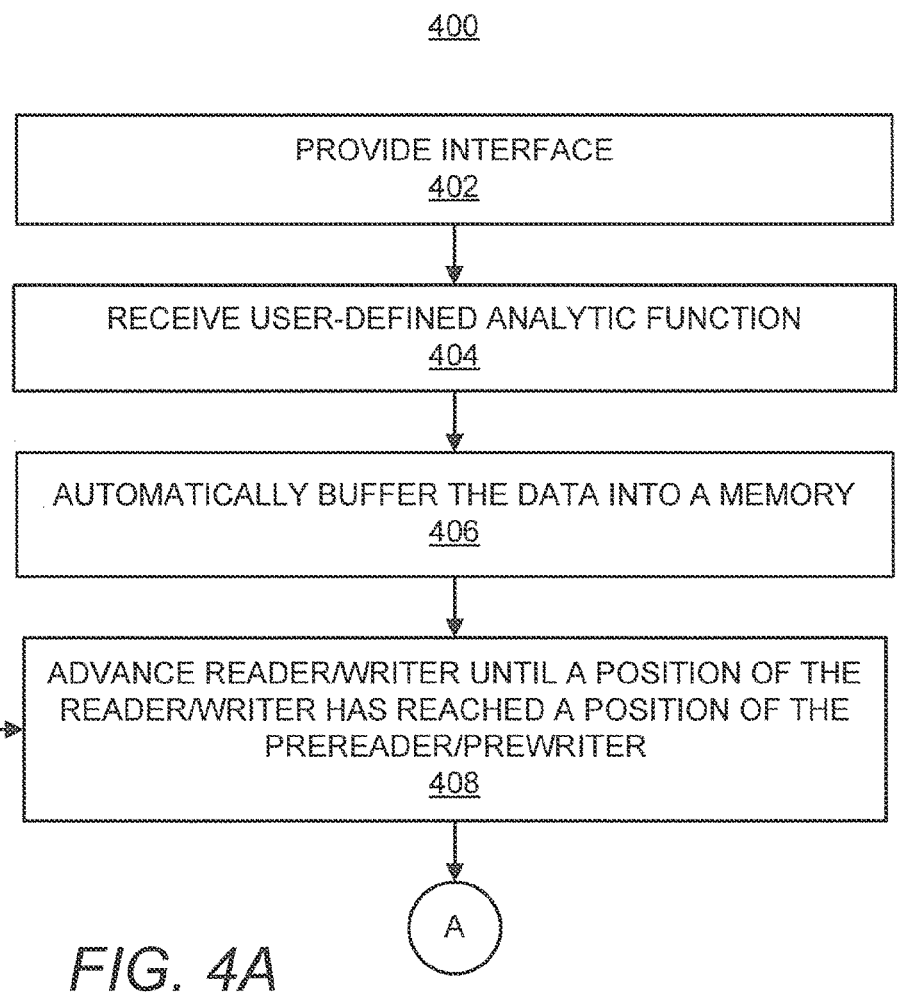
FIGS. 4A-4B, collectively, depict a flow diagram of a method for managing an analytic function to be performed on data stored in an input block, according to another example of the present disclosure.
Figure 4B:
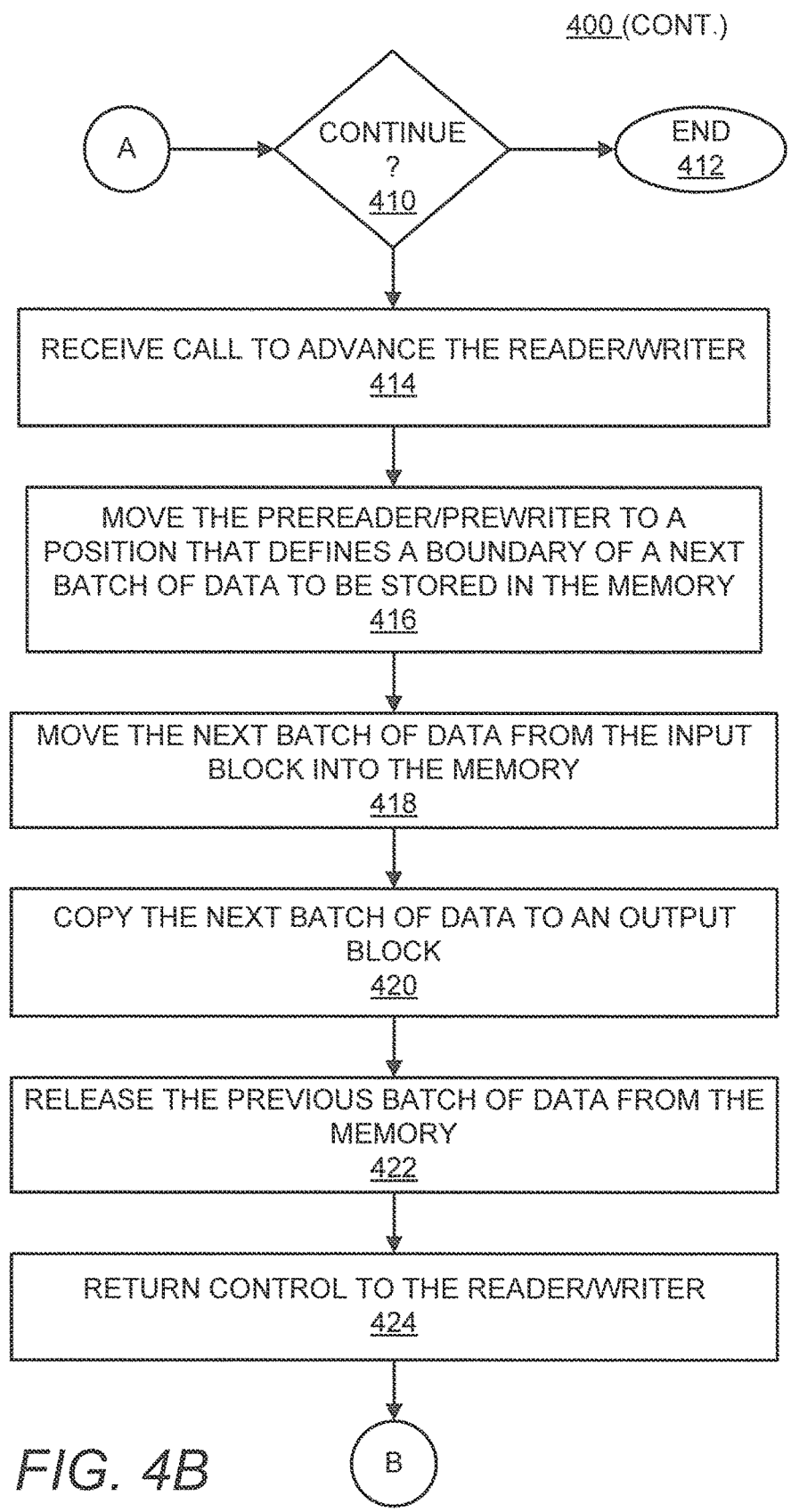

Various manners in which the modules 212-222 may be implemented are discussed in greater detail with respect to the methods 300 and 400 depicted in FIGS. 3 and 4A-4B. FIG. 3, and FIGS. 4A and 4B, collectively, depict respective flow diagrams of methods 300, 400 for managing an analytic function on data stored in an input block, according to an example of the present disclosure. It should be apparent to those of ordinary skill in the art that the methods 300 and 400 represent generalized illustrations and that other operations may be added or existing operations may be removed, modified or rearranged without departing from the scopes of the methods 300 and 400. Although particular reference is made to the interface manager 210 depicted in FIG. 2 as comprising an apparatus and/or a set of machine readable instructions that may perform the operations described in the methods 300 and 400, it should be understood that differently configured apparatuses and/or machine readable instructions may perform the methods 300 and 400 without departing from the scopes of the methods 300 and 400.

The method 400 is related to the method 300 in that the method 400 includes operations in addition to those included in the method 300. Thus, the method 400 is to be construed as including all of the features discussed below with respect to the method 300. The method 400 also differs from the method 300 in that the method 400 includes operations corresponding to implementation or execution of the user-defined analytic function.

Generally speaking, the methods 300 and 400 may separately be implemented to manage an analytic function to be performed on data stored in an input block. In one regard, the methods 300 and 400 may be implemented to provide a user with an interface to a framework that makes it relatively simple for the user to define the analytic function. Particularly, because the framework disclosed herein performs intelligent buffering of the data to be analyzed, the user need not program or otherwise provide instructions regarding how the data is to be buffered.

With reference first to FIG. 3, at block 302, an interface to a framework through which a user is to define an analytic function is provided, for instance, by the interface providing module 214. According to an example, the interface is provided through the input/output module 212 and the input/output interface 206 to the user, for instance, by displaying part of the interface on a locally attached display or by displaying part of the interface on a remotely located display. The interface may comprise, for instance, a portal, such as a web portal, a desktop portal, etc., that provides various options and features to users regarding the definition of an analytic function. In any regard, the interface generally comprises an interface through which the user may write the code and an API for the analytic function, in which, the user may define when to move the Reader and the Writer, without requiring that the user also define how to buffer the data being read by the Reader and the Writer.

By way of particular example, the interface includes a plurality of example analytic functions that a user may use as guides in defining their analytic functions. Thus, for instance, the user may copy a file containing one of the example analytic functions, modify how and when the Reader 112 and the Writer 122 move and when the Writer 122 writes to an output. The user may also compile the file, login into the database, load the compiled file as a library, and create a function. In addition, the user may then run the function. As discussed above, the interface simplifies the programming required by the user to define the analytic function by not requiring the user to also have to program how the data is to be buffered, since the buffering is performed automatically (e.g., without user intervention) by the framework disclosed herein.

As discussed in greater detail herein, the framework includes a Reader 112, a Writer 122, a PreReader 114, and a PreWriter 126, which are individually movable with respect to each other in the input block. In addition, the PreReader 114 controls a predefined boundary of a batch of data 110 that is copied into the memory 204 prior to the Reader 112 reaching the PreReader 114. Likewise, the PreWriter 126 controls a predefined boundary of a batch of data 120 from the Writer 122 that is copied into the memory 204 prior to the Writer 122 reaching the PreWriter 126.

At block 304, the user-defined analytic function is received, for instance, by the user-defined analytic function receiving module 216. According to an example, a user may define the analytic function through the interface and may submit the defined logic through the interface. In this regard, for instance, the interface may provide a user-defined analytic function submission feature, which the user may select to submit the user-defined analytic function to the interface manager 210.

As also discussed above, the user may compile the user-defined analytic function prior to submitting the user-defined analytic function. In addition, the compiled user-defined analytic function may be stored in the disk 205 for later execution. Various operations that the interface manager 210 may implement in executing or implementing the analytic function are described in greater detail with respect to the method 400 depicted in FIGS. 4A and 4B.

Turning now to FIGS. 4A and 4B, at block 402, an interface to a framework through which a user is to define the analytic function is provided, for instance, by the interface providing module 214. Block 402 is similar to block 302 discussed above with respect to FIG. 3. In addition, at block 404, the user-defined analytic function is received, for instance, by the user-defined logic receiving module 216, which is similar to block 304 discussed above with respect to FIG. 3.

At block 406, the data is buffered into the memory, for instance, by the user-defined analytic function implementation module 218. Various manners in which the data, e.g., the Reader buffered data batch 110 and the Writer buffered data batch 120, is stored in at least one area of the memory 204 is described in greater detail hereinabove with respect to FIGS. 1A-1C.

At block 408, the Reader 112 is advanced until a position of the Reader 112 has reached a position of the PreReader 114, for instance, by the user-defined analytic function implementation module 218. Particularly, the Reader 112 may be advanced as programmed by the user through the interface at block 404. Alternatively, at block 408, the Writer 122 is advanced until a position of the Writer 122 has reached a position of the PreWriter 124, for instance, by the user-defined analytic function implementation module 218. Particularly, the Writer 122 may be advanced as programmed by the user through the interface at block 404.

At block 410, a decision is made as to whether the method 400 is to be continued. The method 400 may be continued for the Reader 112 if, for instance, the Reader 112 has not reached a desired target. In this regard, for instance, at block 408, the Reader 112 may be advanced until the Reader 112 has reached the desired target. In addition, the method 400 may be continued for the Writer 122 if the Writer 122 has not reached the end of the input block 102. In response to a determination that the method 400 is not to be continued, the method may end as indicated at block 412. Alternatively, in response to a determination that the method 400 is to be continued, at block 414, a call to advance the Reader 112 is received, for instance, through the input/output module 212. Alternatively, at block 414, a call to advance the Writer 122 is received. In any regard, a call to advance either the Reader 112 or the Writer 122 at block 414 invokes a context switch.

At block 416, the PreReader 114 is moved to a position that defines a boundary of the next batch of data to be stored in the memory 204, for instance, by the PreReader module 220. Alternatively, at block 414, the PreWriter 124 is moved to a position that defines a boundary of the next batch of data 128 to be stored in the memory 204, for instance, by the PreWriter module 222. At block 418, the next batch of data is moved from the input block 102 into the memory 204, for instance, by the PreReader module 220 or the PreWriter module 222. In addition, at block 420, the next batch of data is copied to an output block 104. Various manners in which the next batch of data are defined, moved from the input block 102 into the memory 204, and copied to the output block 104 are described in greater detail herein above with respect to FIGS. 1B and 1C.

At block 422, the previous batch of data 110 or 120 is released from the memory 204, for instance, by either the PreReader module 220 or the PreWriter module 222. The releasing of the previous batch of data 110 or 120 from the memory 204 generally enables the processor 202 to delete that data 110 or 120 as necessary, for instance, as additional data is to be stored in the memory 204.

At block 424, control to the Reader 112 or the Writer 122 is returned. In one regard, by returning control to the Reader 112 or the Writer 122, the Reader 112 or the Writer 122 may be advanced as discussed above with respect to block 408. In addition, blocks 410-424 may be repeated until a determination is made at block 410 to end the method 400. According to an example, the method 400 is implemented for the Reader 112 and the Writer 122 during separate iterations.

Some or all of the operations set forth in the methods 300 and 400 may be contained as a utility, program, or subprogram, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium. Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 5:
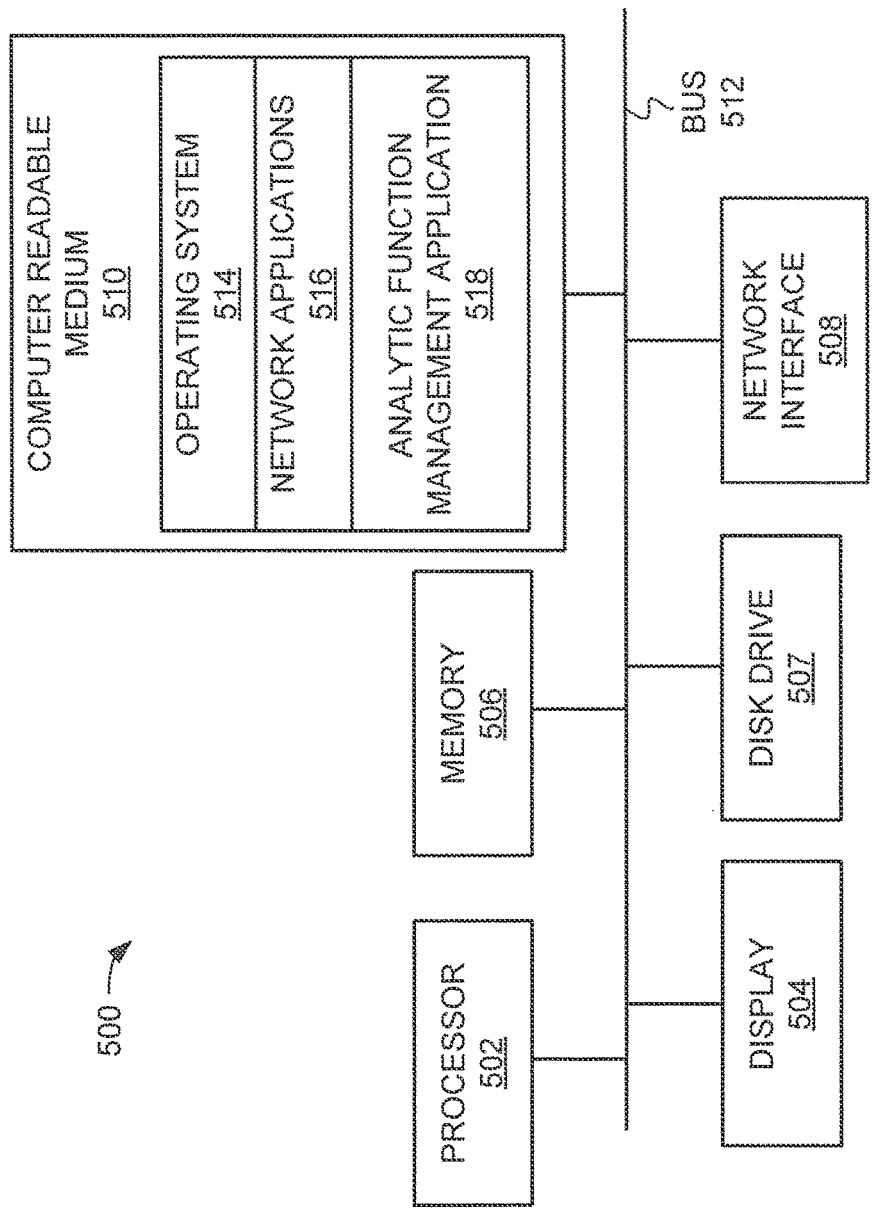
FIG. 5 illustrates a schematic representation of a computing device, which may be employed to perform various functions of the machine depicted in FIG. 2, according to an example of the present disclosure.

Turning now to FIG. 5, there is shown a schematic representation of a computing device 500, which may be employed to perform various functions of the machine 200 depicted in FIG. 2, according to an example. The computing device 500 includes a processor 502, such as but not limited to a central processing unit; a display device 504, such as but not limited to a monitor; a memory 506, such as but not limited to a RAM; a disk drive 507, such as but not limited to an optical disk drive; a network interface 508, such as but not limited to a Local Area Network LAN, a wireless 802.11 LAN, a 3G/4G mobile WAN or a WiMax WAN; and a computer-readable medium 510. Each of these components is operatively coupled to a bus 512. For example, the bus 512 may be an EISA, a PCI, a USB, a FireWire, a NuBus, or a PDS.

The computer readable medium 510 comprises any suitable medium that participates in providing instructions to the processor 502 for execution. For example, the computer readable medium 510 may be non-volatile media, such as memory. The computer-readable medium 510 may also store an operating system 514, such as but not limited to Mac OS, MS Windows, Unix, or Linux; network applications 516; and an analytic function management application 518. The operating system 514 may be multi-user, multiprocessing, multitasking, multithreading, real-time and the like. The operating system 514 may also perform basic tasks such as but not limited to recognizing input from input devices, such as but not limited to a keyboard or a keypad; sending output to the display 504; keeping track of files and directories on medium 510; controlling peripheral devices, such as but not limited to memories, disk drives, printers, image capture device; and managing traffic on the bus 512. The network applications 516 include various components for establishing and maintaining network connections, such as but not limited to machine readable instructions for implementing communication protocols including TCP/IP, HTTP, Ethernet, USB, and FireWire.

The analytic function management application 518 provides various components for managing an analytic function on data stored in any input block as discussed above with respect to the methods 300 and 400 in FIGS. 3 and 4. The analytic function management application 518 may thus comprise the input/output module 212, the interface providing module 214, the user-defined analytic function receiving module 216, the user-defined analytic function implementing module 218, the PreReader module 220, and the PreReader module 222. In this regard, the analytic function management application 518 may include modules for performing the methods 300 and/or 400.

In certain examples, some or all of the processes performed by the application 518 may be integrated into the operating system 514. In certain examples, the processes may be at least partially implemented in digital electronic circuitry, or in computer hardware, machine readable instructions (including firmware and software), or in any combination thereof, as also discussed above.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method implemented by a computer system comprising a physical processor that executes machine readable instructions, said method comprising:
    managing, by the computer system, an analytic function to be performed on data stored in an input block by:
        providing an interface to a framework through which a user is to define the analytic function to be performed on the data stored in the input block,
        wherein the framework is to buffer batches of the data into a memory using at least one of a Reader, a Writer, a PreReader, and a PreWriter on the data stored in the input block responsive to the user-defined analytic function being performed, and
        wherein the Reader, the Writer, the PreReader, and the PreWriter are individually movable with respect to each other in the input block; and
    receiving the user-defined analytic function through the interface.

2. The method according to claim 1, further comprising:
    buffering the batches of the data into the memory in response to invoking the user-defined analytic function, without receiving instructions from the user regarding how the batches of data are to be buffered.

3. The method according to claim 2, wherein the PreReader controls a predefined boundary of a batch of data from the Reader that is copied into the memory prior to the Reader reaching the PreReader and wherein the PreWriter controls a predefined boundary of a batch of data from the Writer that is copied into memory prior to the Writer reaching the PreWriter.

4. The method according to claim 3, wherein the framework is to store the batch of data from the Reader in a first area of memory and store the batch of data from the Writer in a second area of memory different from the first area of memory in response to a position of the Writer being different from a position of the Reader.

5. The method according to claim 3, further comprising:
    advancing the Writer until a position of the Writer has reached a position of the PreWriter;
    receiving a next call to advance the Writer;
    invoking a context switch to provide control of the input block from the Writer to the PreWriter; and
    moving the PreWriter to a position that defines the boundary of a next batch of data to be stored into the memory.

6. The method according to claim 5, further comprising:
    by the PreWriter,
        moving the next batch of data from the input block into the memory;
        copying over carry-over information to an output block;
        releasing the batch of data back to an operating system; and
        returning control to the Writer.

7. The method according to claim 3, further comprising:
    advancing the Reader until a position of the Reader has reached a position of the Pre Reader;
    receiving a next call to advance the Reader;
    invoking a context switch to provide control of the input block from the Reader to the PreReader; and
    moving the PreReader to a position that defines the boundary of a next batch of data to be stored into the memory.

8. The method according to claim 7, further comprising:
    by the PreReader,
        moving the next batch of data from the input block into the memory;
        copying over carry-over information to an output block;
        releasing the batch of data back to an operating system; and
        returning control to the Reader.

9. The method according to claim 1, wherein receiving the user-defined analytic function through the interface further comprises receiving instructions regarding when to move the Reader and the Writer during implementation of the user-defined analytic function, without receiving instructions regarding how to buffer the data.

10. An apparatus comprising:
    a physical processor implementing machine readable instructions that cause the apparatus to:
    manage an analytic function to be performed on data stored in an input block by:
        providing an interface to a framework through which a user is to define the analytic function to be performed on the data stored in the input block,
        wherein the framework is to buffer batches of the data into a memory using at least one of a Reader, a Writer, a PreReader, and a PreWriter on the data stored in the input block responsive to the user-defined analytic function being performed,
        wherein the Reader, the Writer, the PreReader, and the PreWriter are individually movable with respect to each other in the input block,
        wherein the PreReader controls a predefined boundary of a batch of data from the Reader that is copied into the memory prior to the Reader reaching the PreReader, and
        wherein the PreWriter controls a predefined boundary of a batch of data from the Writer that is copied into memory prior to the Writer reaching the PreWriter; and receive the user-defined analytic function through the interface.

11. The apparatus according to claim 10, wherein the physical processor implements machine readable instructions that cause the apparatus to buffer the batch of data from the Reader and the batch of data from the Writer in response to invoking the user-defined analytic function and without receiving instructions from the user regarding how the batches of data are to be buffered.

12. The apparatus according to claim 10, wherein the physical processor implements machine readable instructions that cause the apparatus to:
advance the Writer until a position of the Writer has reached a position of the PreWriter;
receive a next call to advance the Writer;
invoke a context switch to provide control of the input block from the Writer to the PreWriter;
move the PreWriter to a position that defines the boundary of a next batch of data to be stored into the memory;
move the next batch of data from the input block into the memory;
copy over carry-over information to an output block;
release the batch of data back to an operating system; and
return control to the Writer.

13. The apparatus according to claim 10, wherein the physical processor implements machine readable instructions that cause the apparatus to:
advance the Reader until a position of the Reader has reached a position of the Pre Reader;
receive a next call to advance the Reader;
invoke a context switch to provide control of the input block from the Reader to the Pre Reader;
move the PreReader to a position that defines the boundary of a next batch of data to be stored into the memory;
move the next batch of data from the input block into the memory;
copy over carry-over information to an output block;
release the batch of data back to an operating system; and
return control to the Reader.

14. A non-transitory computer readable storage medium comprising machine readable instructions that when executed by a processor, cause a system to:
manage an analytic function on data stored in an input block by:
providing an interface to a framework through which a user is to define the analytic function to be performed on the data stored in the input block,
wherein the framework is to buffer batches of the data into a memory using at least one of a Reader, a Writer, a PreReader, and a PreWriter on the data stored in the input block responsive to the user-defined analytic function being performed,
wherein the Reader, the Writer, the PreReader, and the PreWriter are independently movable with respect to each other in the input block, and
wherein the PreReader controls a predefined boundary of a batch of data from the Reader that is copied into the memory prior to the Reader reaching the PreReader, and
wherein the PreWriter controls a predefined boundary of a batch of data from the Writer that is copied into memory prior to the Writer reaching the PreWriter; and
receive the user-defined analytic function through the interface.

15. The non-transitory computer readable storage medium according to claim 14, comprising said machine readable instructions that when executed by a processor, cause the system to:
receive instructions regarding when to move the Reader and the Writer during implementation of the user-defined analytic function, without receiving instructions regarding how to buffer the data.

16. The method according to claim 4, wherein the framework is to store the batch of data from the Reader and the batch of data from the Writer in a same area of memory in response to the position of the Writer being the same as the position of the Reader.

17. The apparatus according to claim 11, wherein the physical processor implements machine readable instructions that cause the apparatus to:
store the batch of data from the Reader in a first area of memory and store the batch of data from the Writer in a second area of memory different from the first area of memory in response to a position of the Writer being different from a position of the Reader; and
store the batch of data from the Reader and the batch of data from the Writer in a same area of memory in response to the position of the Writer being the same as the position of the Reader.

18. The non-transitory computer readable storage medium according to claim 14, comprising said machine readable instructions that when executed by a processor, cause the system to:
advance the Writer until a position of the Writer has reached a position of the PreWriter;
receive a next call to advance the Writer;
invoke a context switch to provide control of the input block from the Writer to the PreWriter;
move the PreWriter to a position that defines the boundary of a next batch of data to be stored into the memory;
move the next batch of data from the input block into the memory;
copy over carry-over information to an output block;
release the batch of data back to an operating system; and
return control to the Writer.

19. The non-transitory computer readable storage medium according to claim 14, comprising said machine readable instructions that when executed by a processor, cause the system to:
advance the Reader until a position of the Reader has reached a position of the Pre Reader;
receive a next call to advance the Reader;
invoke a context switch to provide control of the input block from the Reader to the Pre Reader;
move the Pre Reader to a position that defines the boundary of a next batch of data to be stored into the memory;
move the next batch of data from the input block into the memory;
copy over carry-over information to an output block;
release the batch of data back to an operating system; and
return control to the Reader.

20. The non-transitory computer readable storage medium according to claim 14, comprising said machine readable instructions that when executed by a processor, cause the system to:
store the batch of data from the Reader in a first area of memory and store the batch of data from the Writer in a second area of memory different from the first area of memory in response to a position of the Writer being different from a position of the Reader; and store the batch of data from the Reader and the batch of data from the Writer in a same area of memory in response to the position of the Writer being the same as the position of the Reader.

* * * * *